March 26, 1968 — J. W. HILBORN — 3,375,370
SELF-POWERED NEUTRON DETECTOR
Filed Dec. 28, 1965 — 2 Sheets-Sheet 1

INVENTOR
John W. Hilborn
BY Birch and O'Brien
ATTORNEYS

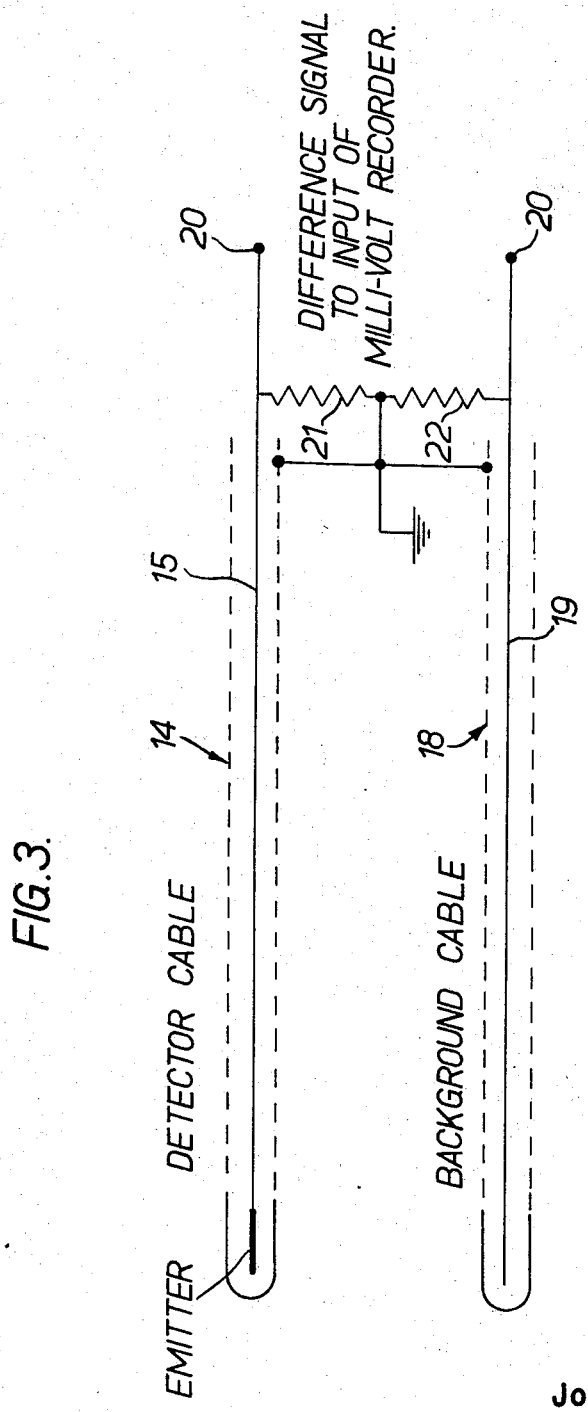

United States Patent Office 3,375,370
Patented Mar. 26, 1968

3,375,370
SELF-POWERED NEUTRON DETECTOR
John W. Hilborn, Chalk River, Ontario, Canada, assignor to Atomic Energy of Canada Limited, Ottawa, Ontario, Canada, a corporation of Canada
Continuation-in-part of application Ser. No. 298,284, July 29, 1963. This application Dec. 28, 1965, Ser. No. 528,674
7 Claims. (Cl. 250—83.1)

ABSTRACT OF THE DISCLOSURE

A self-powered neutron detector particularly suitable for flux measurements within the core of nuclear reactors and consisting of a non-fissionable emitter separated from a conducting collector by a solid dielectric insulator which can retain its high electrical resistivity when continuously exposed to intense radiation, the emitter and collector being connected to a load resistance for measurement of the current through the load resistance, the current being indicative of the intensity of the neutron flux.

---

This application is a continuation-in-part of application Ser. No. 298,284, filed July 29, 1963, and assigned to the same assignee as this application and now abandoned.

The present invention relates to a neutron flux detector which is particularly useful for flux measurements in nuclear reactors. A detector constructed in accordance with the present invention is also useful for flux mapping in nuclear reactor cores.

Numerous devices have been developed for making measurements of neutron flux in nuclear reactors. These devices normally have required that an opening be made in the biological shield of the nuclear reactor through which the neutron flux may stream to a detector positioned outside the reactor. The undesirability of making such openings in the biological shield of a nuclear reactor is of course immediately apparent to all those skilled in the art. The external detectors which have, up until now, been used for neutron flux detection have also required an external source of power to operate the detector.

Miniaturized, uncompensated ion chambers have been constructed for use in nuclear reactors, but such miniature ion chambers require an external source of power and are not suited to withstand the continuous pressures, temperatures and radiation fields encountered within the core of a nuclear reactor.

The present invention provides a miniature neutron flux detector which requires no external source of power, and which may be used internally within a nuclear reactor, thus avoiding a large opening in the biological shield. Flux detectors of the present invention are also formed entirely of solid state materials, and are thus inherently more able to withstand the high temperatures and pressure encountered within the core of a nuclear reactor.

The present invention provides a self-powered neutron flux detector which consists of an emitter formed of conducting or semiconducting material, which emits electrons when irradiated by neutrons, a collector which produces few electrons in a neutron flux compared to the emitter, and an insulator interposed between the emitter and collector which is of a solid dielectric material capable of retaining high electrical resistivity when continuously exposed to intense radiation fields. One form of a detector, in accordance with the present invention, is of elongated coaxial form with a central conductor formed of vanadium surrounded by an aluminum oxide dielectric, all of which is encased in a stainless steel tube. This structure may conveniently be connected to a flexible insulated coaxial cable which may also be sheathed in stainless steel and which may be of very small cross section, for example .040" outside diameter.

Accordingly, the present invention lends itself extremely well to miniaturization, which is a great advantage for devices intended for use in the core of a nuclear reactor.

Figure 1:
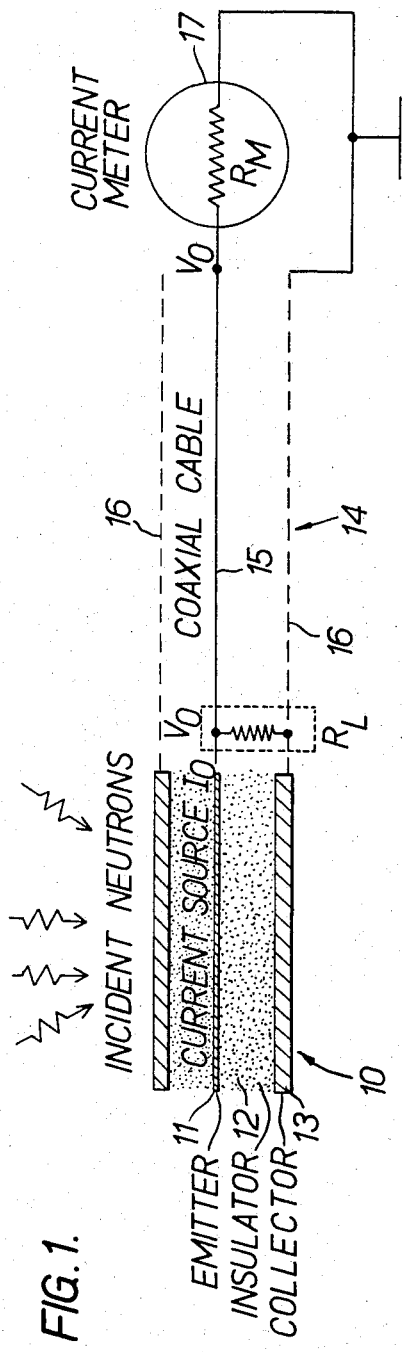
Figure 2:
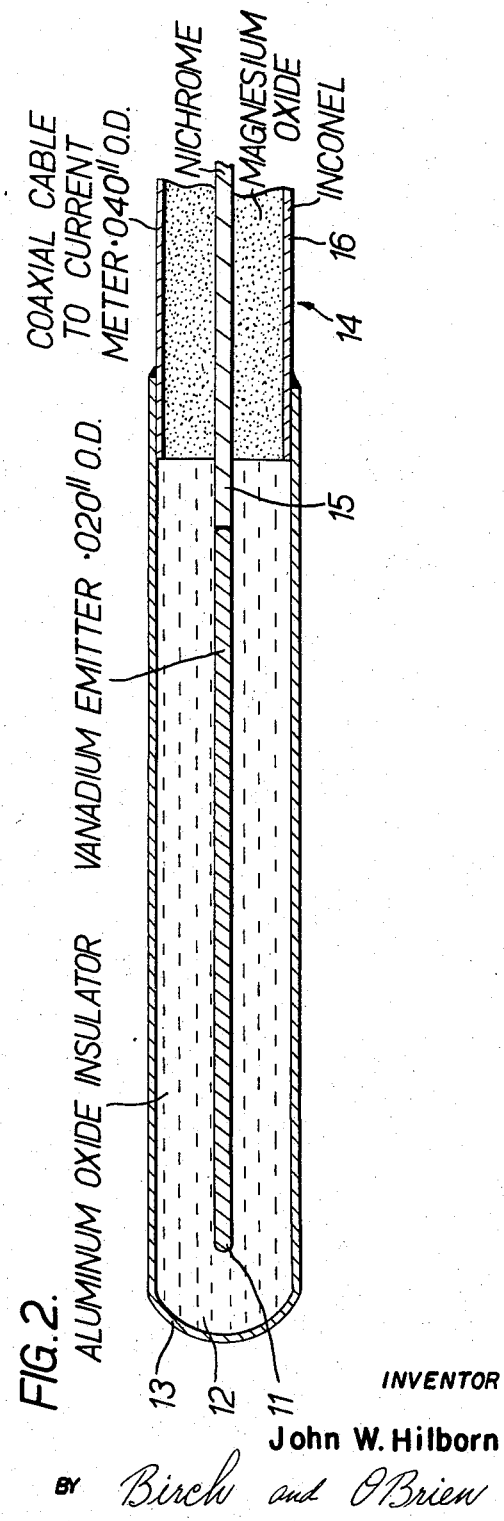

In drawings which illustrate the construction and use of embodiments of the present invention:

FIGURE 1 is a schematic cross section illustrating the principles of a neutron detector of the present invention, FIGURE 2 is a cross section of a neutron detector constructed in accordance with the present invention, and FIGURE 3 is a schematic view of apparatus in accordance with the present invention for compensating for background signals.

FIGURE 1 illustrates the general principle of operation of a neutron detector of the present invention. As shown, the detector consists of three component parts: an emitter 11, an insulator 12 and a collector 13. These three components may be arranged as coaxial cylinders or flat parallel plates. FIGURE 1 is applicable to both arrangements.

The emitter 11 is a conducting or semi-conducitng material which spontaneously emits energetic electrons following the absorption of neutrons, the insulator 12 is a solid dielectric material capable of retaining high electrical resistivity, even when continuously exposed to intense radiation fields, and the collector 13 is a conducting material which produces few electrons in a neutron flux compared to an emitter material.

The emitter 11 may be the central electrode of a coaxial configuration, and is joined to the central conductor 15 of a coaxial cable 14, and the collector 13 may be the outer electrode of a coaxial configuration, and is joined to the outer conductor 16 of the cable. An electron current measuring device 17 is connected between the inner and outer conductors of the coaxial cable 16.

Incoming neutrons easily pass through the outer shield or collector 13 and insulator 12 to be preferentially absorbed by the emitter 11. Atoms of emitter material become unstable or radioactive following neutron absorption, and then spontaneously emit energetic electrons while returning to a stable state. Many of the electrons are energetic enough to escape from the emitter 11, penetrate the insulator 12, and finally come to rest in the grounded collector 13, or its surroundings. The deficit of electrons in the emitter 11 results in a positive charge on the central conductor 15 of the coaxial cable 14. If the rate of production of this positive charge is continuously measured with a current measuring device 17, the observed signal will be directly proportional to the rate of absorption of neutrons in the emitter. In other words, the detector current is directly proportional to the average neutron flux over surface of the emitter.

If $I_0$ is the net source current of energetic electrons ejected from the emitter 11, $V_0$ is the equilibrium output potential of the central electrode 11 relative to ground, $R_L$ is the effective leakage resistance between the central electrode 11 and the outer grounded electrode 13, and $R_M$ is the effective resistance of the current measuring device 17, then $$I_0 = \frac{V_0}{R_L} + \frac{V_0}{R_M} \approx \frac{V_0}{R_M} \text{ if } R_L \gg R$$

(Equation 1)

Hence for a given emitter, the measured output voltage $V_0$ is proportional to neutron flux, and independent of $R_L$ as long as $R_M \ll R_L$.

The general principle of the direct current neutron detector is not restricted to the particular arrangement illustrated in FIGURE 1. For example, the neutron absorbing material which emits electrons may be used for the outer electrode 13 instead of the inner electrode 11. In that case, the inner electrode 11 becomes negatively charged instead of positively charged. Any arrangement of the three basic components which allows energetic primary electrons to travel spontaneously from the emitter to the collector through the insulator, could be used as a self-powered neutron detector.

The size of the emitter electrode is limited only by practical considerations. In particular, it is quite feasible to construct a coaxial cable detector hundreds of feet long simply by using a suitable emitter material for the central conductor of the cable along its entire length. The parallel plate type of detector may utilize a large emitter area by curving the plates into a tightly wound cylinder.

The nuclear properties of the materials chosen for the three component parts are important in the design of a practical direct current neutron detector, depending on the use to which the detector is to be put. Suitable materials for construction are listed in Table 1. The essential nuclear properties of the various emitter materials are given in Table 2.

TABLE 1

| Emitter | Collector | Insulator |
| --- | --- | --- |
| Aluminum<br>Vanadium<br>Silver<br>Rhodium<br>Cadmium<br>Gadolinium<br>Cobalt<br>Scandium | Aluminum<br>Magnesium<br>Titanium<br>Nickel<br>Stainless steel<br>Nickel-chrome alloys<br>Zirconium-aluminum alloys | Aluminum oxide<br>Magnesium oxide<br>Xilicon oxide<br>Zirconium oxide |

It should be noted that electrons emitted from rhodium, silver, vanadium and aluminum arise from beta decay, and are delayed by the radioactive lifetime of the capture product nucleus, whereas electrons emitted from gadolinum, and cadmium, cobalt and scandium arise from internal conversion, and are emitted from excited nuclei promptly following neutron capture. The beta particles from 5 year cobalt 60 and 84 day scandium 46 do not interfere with the prompt electrons because they have low energies and are mostly absorbed in the emitter itself. Detectors incorporating cobalt and scandium respond promptly to changes in neutron flux because they make use of Compton and photo electrons produced by neutron capture gamma rays.

A practical in-core neutron detector construction is shown in FIGURE 2. This drawing, which is not to scale, shows an emitter 11 which is formed of vanadium and has an outside diameter of 0.020″, an aluminum oxide insulator 12 and a stainless steel collector 13, which is in the form of a closed tube of approximately 9″ in length and approximately .0625″ outside diameter. The detector is connected to a coaxial cable of .040″ outside diameter with the emitter 11 butt welded to the central conductor 15, and the collector 13 brazed to outer conductor 16 of the coaxial cable 14. The central conductor 15 was formed of Nichrome, and was insulated from the outer conductor 16 by magnesium oxide insulation. The outer conductor 16 was formed of Inconel and was of an outside diameter, as previously mentioned, of .040″. The connecting cable actually used with the prototype of the invention was manufactured by "Sodern Thermocoax," Société Anonyme d'Etudes et Réalisation Nucléaires, 10 Rue de la Passerelle, Suresne, Seine, France. The outer sheath may be stainless steel or Inconel, and the central conductor may be nickel or Nichrome. The insulation is compressed magnesium oxide. The cable shown in FIGURE 2 has an Inconel sheath and Nichrome core. The supplier's information on the dimensions of the cable is as follows:

|  | Percent of O.D. |
| --- | --- |
| Core | 34 |
| Sheath | [1] 12 |
| Insulation | [1] 21 |

[1] I. e., × 2.

Hence for a .0394″ O.D. cable, the sheath thickness is .0047″ and the insulation thickness .0083″.

It should be noted that the materials chosen are all suitable for high temperature operation. The vanadium emitter is longer than necessary for many in-core applications, but serves to demonstrate that such a detector can easily be made in any desired length. If greater sensitivity is required, a rhodium emitter of the same diameter produces approximately 15 times as much current per unit length.

The prototype shown in FIGURE 2 has been operating successfully in the high flux region of the NRX reactor at Chalk River since Nov. 20, 1962. The average thermal flux along the vanadium emitter is $1.1 \times 10^{14}$ n./cm.$^2$-sec. when the reactor is operating normally at maximum output. The measured current from the vanadium under these conditions is 0.19 microampere.

It is easily demonstrated that the observed detector current arises from the beta decay of Vanadium 52, and not from other sources. Immediately following a reactor shutdown, the signal is observed to decrease with a half life of 3.8 minutes. The exponential decay may be followed for two decades or more, depending on the magnitude of the background signal.

The currents to be measured generally lie in the range $10^{-6}$ to $10^{-12}$ ampere, so that there are any number of commercial amplifiers, such as Keithley Instruments, Model 410, which would be entirely satisfactory. It was shown above that the measured current is unaffected by leakage as long as the effective input resistance of the current measuring device is small compared to the leakage resistance. Hence it is desirable to use an instrument which has a low input resistance.

A linear amplifier with gain G and feedback resistance $R_f$ has an effective input resistance of $R_f/G$. Thus, it is generally possible to achieve as low an effective input

TABLE 2

| Neutron Absorbing Isotope | | | Radioactive Half Life of Capture Product | Burnout Rate in Thermal Flux of $10^{13}$ n./cm.$^2$-sec. |
| --- | --- | --- | --- | --- |
| Mass Number | Abundance (Percent) | Cross Section (Barns) | | |
| Aluminium 27 | 100 | 0.21 | 2.3 minutes | 0.006% per year. |
| Vanadium 51 | 99.76 | 4.5 | 3.8 minutes | 0.012% per month. |
| Silver 107 | 51.35 | 44 | 2.3 minutes | 0.11% per month. |
| Silver 109 | 48.65 | 110 | 24 seconds | 0.28% per month. |
| Rhodium 103 | 100 | 150 | 42 seconds | 0.39% per month. |
| Cadmium 113 | 12.26 | 20,000 | Prompt | 1.7% per day. |
| Cobalt 60 | | | do | |
| Scandium 46 | | | do | |
| Gadolinium 155 | 14.73 | 56,200 | do | 4.9% per day. |
| Gadolinium 157 | 15.68 | 242,000 | | 21% per day. | resistance as is required, simply by using a feedback amplifier with sufficiently high gain. For example, if the leakage resistance $R_L$ were $10^8$ ohms, and $R_f$ were $10^9$ ohms, the amplifier gain G should be at least 1000.

If the detector current is greater than 0.1 microampere, a standard millivolt meter or recorder may be used as a current measuring device by connecting a suitable resistance across the input terminals. For example, if the recorder range is 0–10 millivolts, a 10,000 ohm resistance at the input results in a current range 0–1.0 microampere. In practice, most instruments suitable for measuring thermocouple signals are easily adapted to the measurement of neutron detector signals.

The load resistance depends on the size of signal available, and the type of current measuring instrument being used. Typically, a high flux detector producing 0.5 microampere would be terminated by a 10,000 ohm measuring resistance. A low flux detector producing $0.5 \times 10^{-11}$ ampere would be connected to an amplifier having an effective input resistance of $10^9$ ohms. The load resistance may always be decreased, if required, by increasing the gain of the current measuring device. In any practical neutron detector, it is desirable to use a load resistance which is less than 1% of the leakage resistance.

The most significant indication of deterioration or damage to the neutron detector of the invention is a decrease in the leakage resistance $R_L$. This parameter may be periodically measured using the self-generated detector current while the reactor is operating at full power. By increasing the measuring resistance $R_M$ until the current through $R_M$ decreases slightly, $R_L$ may easily be calculated using Equation 1. It is assumed in this calculation that the source current $I_0$ depends only on the neutron flux, and is independent of both $R_L$ and $R_M$.

As a typical example, consider the prototype detector shown in FIGURE 2. After six months in a thermal flux of $1.1 \times 10^{-14}$ n./cm.$^2$-sec., the measured leakage resistance $R_L$ was still greater than $2 \times 10^8$ ohms. Since the normal measuring resistance $R_M$ is $10^4$ ohms, there is still a considerable margin before the measured current through $R_M$ will be affected by changes in $R_L$. In fact $R_L$ can decrease to $10^6$ ohms before the current changes by more than 1%.

It has been observed that the entire length of coaxial cable exposed to radiation in the reactor core generates a "background" signal which is superimposed upon the "neutron" signal from the emitter. Part of the background signal arises from Compton photoelectrons ejected from the central conductor of the cable. Some of these electrons pass through the magnesium oxide insulation, and become absorbed in the grounded outer sheath, thus resulting in a positive charge on the central conductor. The measured current has the same polarity as the detector current.

Another possible source of background current is the flux of energetic electrons from surrounding materials in the reactor core. Any nearby beta emitters such as aluminum will produce a significant background signal on the insulated central conductor. The polarity of this signal is opposite to that of the detector signal, and of course the magnitude depends on the external electron flux along the entire cable.

FIGURE 3 illustrates how the background current may be subtracted from the total current to give a direct indication of the true emitter current. A second coaxial cable 18 is installed immediately adjacent to the original detector cable 14. This additional cable 18 has no detector at the tip, but in every other respect is similar to the detector cable 14. The central conductors 15 and 19 of the two cables are connected across the input terminals of the millivolt recorder as shown in FIGURE 3. Since the two central conductors are connected to ground through identical load resistances 21 and 22, the measured potential difference is directly proportion to the difference between the self-generated currents in the two cables.

This method of compensation has been successfully demonstrated using the prototype vanadium detector cable and a second "background" cable. Identical lengths were installed in the NRX reactor core, and the two currents measured independently before connecting the two cables as shown in FIGURE 3. The observed recorder output exactly equalled the algebraic difference between the two independent signals.

An advantage of a self-powered neutron detector following the present invention is that the self-generated current eliminates entirely the need for an external power supply. Additionally, in fluxes of $10^{13}$ n./cm.$^2$-sec. and greater, the self-generated signal is large enough to measure directly on a millivolt recorder, exactly as a thermocouple signal is measured. Additionally, the principle of operation of the detector of this invention does not depend on ionization of gas, or any form of electron multiplication. The three basic components are made of solid materials only and no liquids or gasses are used. Accordingly, the detector is much more rugged. This simple rugged construction enables this detector to withstand high temperature, high pressure, and intence radiation fields. It will be noted that in the form shown in FIGURE 2, the detector is integral with its connecting coaxial cable and is easily miniaturized to 0.0625" O.D. for low parasitic neutron absorption. This detector can be made in a continuously flexible form and is easily constructed in any length by using emitter material for the central conductor of commercial coaxial cable. It has also been observed that the burnout rate in detectors using any of the first four emitter materials listed in Table 1 is much lower than in detectors utilizing uranium 235, hence the problem of decreasing sensitivity is much less serious. And finally, reliable operation of a prototype detector has been demonstrated by a six-month in-core radiation test in a thermal neutron flux of $10^{14}$ n./cm.$^2$-sec.

I claim:
1. A self-powered neutron detector comprising,
   (a) a non-fissionable emitter capable of conducting electricity due to the presence of mobile charge carriers within the material which spontaneously emits energetic electrons following the absorption of neutrons,
   (b) a conducting collector which produces few electrons in a neutron flux compared to said emitter,
   (c) a solid dielectric insulator capable of retaining high electrical resistivity when continuously exposed to intense radiation fields, and positioned between said emitter and said collector, and
   (d) means for connecting said emitter and said collector to a load resistance for measurement of the current through said load resistance, said current being indicative of the intensity of the neutron flux in which said neutron detector is positioned.

2. A neutron detector as claimed in claim 1 wherein the effective leakage resistance between the emitter and the collector is very much greater than said load resistance.

3. A neutron detector according to claim 1 wherein said means connecting said emitter and collector to said load resistance is a coaxial cable.

4. A neutron detector according to claim 3 wherein said emitter is formed of a solid substantially cylindrical member, said insulator is coaxial and in intimate contact with said emitter, and said collector is coaxially arranged about said insulator, and said emitter and collector are electrically united with the inner and outer conductors of said coaxial cable, respectively.

5. A neutron detector as claimed in claim 1 wherein said emitter is formed from a material selected from the group consisting of aluminum 27, vanadium 51, silver 107 and silver 109, rhodium 103, cadmium 113, cobalt 60, scandium 46, gadolinium 155 and gadolinium 157, said insulator is formed of a material from the group consisting of aluminum oxide, magnesium oxide, silicon oxide, zirconium oxide, and said collector is formed of a material from the group consisting of aluminum, magnesium, titanium, nickel, stainless steel, nickel-chrome alloys, and zirconium-aluminum alloys.

6. A neutron detector as claimed in claim 4 wherein said emitter is formed of rhodium 103, said insulator is formed of aluminum oxide and said collector is formed of stainless steel.

7. A detector according to claim 4 wherein said emitter is formed of vanadium 51, said insulator is formed of aluminum oxide and said collector is formed of stainless steel.

No references cited.

ARCHIE R. BORCHELT, *Primary Examiner.*